(12) United States Patent
Bashir et al.

(10) Patent No.: US 9,601,136 B2
(45) Date of Patent: Mar. 21, 2017

(54) DATA WRITER FRONT SHIELD WITH VARYING THROAT HEIGHT

(71) Applicant: Seagate Technology LLC, Cupertino, CA (US)

(72) Inventors: Muhammad Asif Bashir, Londonderry (GB); JianHua Xue, Maple Grove, MN (US); Beverley R. McConnell, Londonderry (GB); Shengzhou Liao, Londonderry (GB); Wei Tian, Eden Prairie, MN (US); Prim Gangmei, Londonderry (GB); Swaraj Basu, Londonderry (GB); Mark A. Gubbins, Letterkenny (IE)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/132,876

(22) Filed: Apr. 19, 2016

(65) Prior Publication Data

US 2016/0254011 A1 Sep. 1, 2016

Related U.S. Application Data

(63) Continuation of application No. 14/633,830, filed on Feb. 27, 2015, now Pat. No. 9,349,388.

(51) Int. Cl.
*G11B 5/10* (2006.01)
*G11B 5/31* (2006.01)

(52) U.S. Cl.
CPC ............ *G11B 5/315* (2013.01); *G11B 5/10* (2013.01); *G11B 5/3116* (2013.01)

(58) Field of Classification Search
None
See application file for complete search history.

(56) References Cited

U.S. PATENT DOCUMENTS

| | | | | |
|---|---|---|---|---|
| 8,035,930 B2 * | 10/2011 | Takano | ............... | G11B 5/1278 360/319 |
| 8,289,649 B2 | 10/2012 | Sasaki et al. | | |
| 8,582,238 B1 | 11/2013 | Liu et al. | | |
| 8,614,860 B2 | 12/2013 | Han et al. | | |
| 8,767,347 B1 * | 7/2014 | Sasaki | ................. | G11B 5/1278 360/123.06 |
| 8,830,625 B2 | 9/2014 | Linville et al. | | |
| 8,830,626 B2 | 9/2014 | Heim et al. | | |
| 9,082,422 B2 * | 7/2015 | Sasaki | ................. | G11B 5/3163 |
| 2005/0068678 A1 * | 3/2005 | Hsu | ......................... | G11B 5/11 360/125.3 |
| 2005/0141137 A1 * | 6/2005 | Okada | ...................... | G11B 5/11 360/122 |
| 2006/0000794 A1 * | 1/2006 | Le | ............................ | G11B 5/112 216/22 |

* cited by examiner

*Primary Examiner* — Carlos E Garcia
(74) *Attorney, Agent, or Firm* — Hall Estill Attorneys at Law

(57) ABSTRACT

A data storage device employing a data writer may configure the data writer with at least a write pole that is separated from a front shield on an air bearing surface. The front shield can be arranged to continuously extend from the air bearing surface a first throat height distal the write pole and a second throat height proximal the write pole with the first and second throat heights being different.

20 Claims, 4 Drawing Sheets

DATA WRITER FRONT SHIELD WITH VARYING THROAT HEIGHT

RELATED APPLICATION

This application is a continuation of co-pending U.S. patent application Ser. No. 14/633,830 filed on Feb. 27, 2015.

SUMMARY

A data writer has, in various embodiments, a write pole that is separated from a front shield on an air bearing surface. The front shield continuously extends from the air bearing surface a first throat height distal the write pole and a second throat height proximal the write pole with the first and second throat heights being different.

DETAILED DESCRIPTION

Increased data generation, transfer, and consumption have stressed the data capacity and access times of data storage devices. Consumer and industry demand for physically smaller data storage devices have compounded these stresses. Arranging data bits in a denser pattern on a medium can heighten data capacity, but can be difficult to accurately access due to less non-magnetic space between the data bits. Such increased data bit density emphasizes configuring magnetic shields to increase the magnetic resolution of a data writer. However, current magnetic shield configurations can inadvertently become saturated and degrade data writing performance.

Accordingly, consumer and industry are interested in data writer shields that can increase magnetic resolution without inadvertently becoming saturated, which can lead to unwanted adjacent track interference and erasure conditions. Such interests are addressed by tuning a data writer to have a front shield with a varying throat height on an air bearing surface (ABS) and in relation to a write pole. As a non-limiting example, a write pole is laterally disposed between side shields and vertically separated from a front shield that has a first throat height distal the write pole and a different second throat height proximal the write pole.

By tuning the shape of the front shield relative to the write pole, a balance of magnetic shielding of the write pole on the ABS and flux leakage from the write pole is achieved. That is, the throat height of the front shield can be shaped to provide greater magnetic shielding distal the write pole and mitigated flux leakage proximal the write pole. Tuning the second throat height to be smaller than the first throat height can decrease the amount of shield material immediately adjacent the write pole, which can increase data writing field gradient between the write pole and front shield. The ability to shape the front shield with an unlimited variety of designs can customize the balance of shielding and flux leakage mitigation to accommodate a diverse range of data storage conditions and environments.

Figure 1:
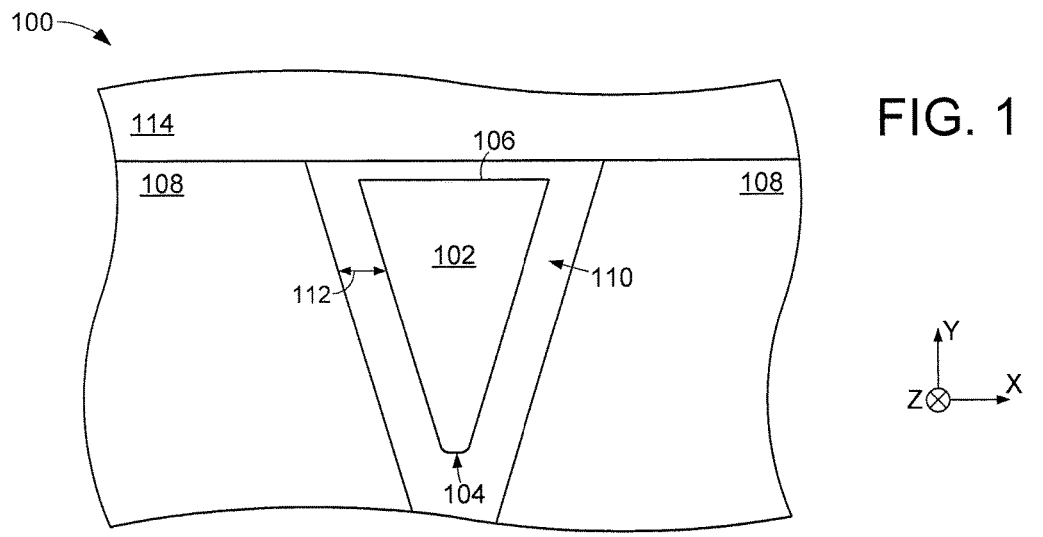
FIG. 1 is an air bearing view line representation of a portion of an example data writer arranged in accordance with various embodiments.

It is noted that the various embodiments of the present disclosure are directed to data writer applications in a hard disk drive data storage device, such arrangement is not required or limiting. In FIG. 1, a line representation of a portion of an example data writer 100 is shown in accordance with some embodiments. The data writer 100 has a write pole 102 that has a trapezoidal shape on the ABS that defines a leading tip 104 and a trailing edge 106 in view of when data bits are encountered by the write pole 102. It is noted that the terms "front" and "trailing" are synonymous relative descriptors meant to denote position relative to encountered portions of an adjacent data storage medium. Hence, the leading tip 104 will pass over a portion of a data storage medium before the trailing edge 106 when the data storage medium rotates in a first direction along the Y axis.

Although it is contemplated that a data writer can be configured to accurately write data bits when the adjacent data storage medium is rotating in any direction, the trapezoidal shape of the write pole 102 is tuned for use while the data storage medium is rotating so that the leading tip 104 encounters a data bit before the trailing edge 106. The write pole 102 is separated from side shields 108 along a lateral (cross-track) direction parallel to the X axis by a non-magnetic material 110. The non-magnetic material 110 may continuously extend with a uniform or varying gap distance 112 to separate the write pole 102 from side 108 and front 114 shields. It is contemplated that the leading portion of the write pole 102 is shielded by a leading shield or by portions of the side shields 108 that extend proximal the leading tip 104.

The gap distance 112 may be uniform or varying and may be different proximal the front 114 shield. Decreasing the gap distance 112 between the front tip 104 and front shield 114 may increase the magnetic resolution of the write pole 102, but can degrade writer 100 performance. For instance, a small gap distance 112 can promote shunting and flux leakage from the write pole 102 to the front shield 114 that can consequently distribute magnetization to the side shields 108, which increases the risk of adjacent track interference and side track erasure conditions that diminish data bit writing accuracy and reliability.

Figure 2:
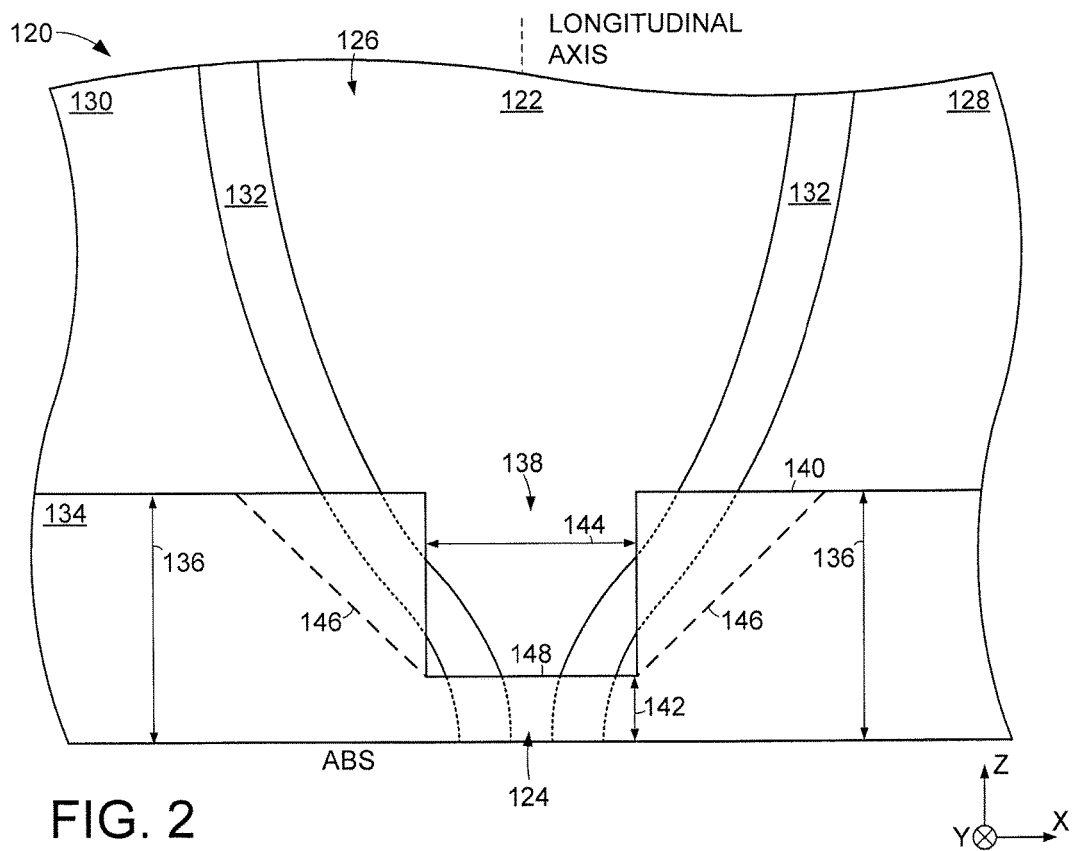
FIG. 2 illustrates a line representation of a portion of a data writer configured in accordance with some embodiments.

FIG. 2 displays a top view line representation of a portion of an example data writer 120 that is tuned in accordance with some embodiments to provide a balance between shielding and data bit writing performance. The data writer 120 has a write pole 122 that is shaped with a narrow pole tip 124 on the ABS and a wider pole body 126 distal the ABS, which can promote efficient funneling of magnetic writing fields to an adjacent data storage medium. The write pole 122 is laterally separated from first 128 and second 130 side shields along the cross-track direction and X axis by non-magnetic material 132 that extends from the ABS. The respective side shields 128 and 130 each extend from a front shield 134, as illustrated by segmented regions of the write pole 122 and side shields 128 and 130.

The side shields 128 and 130 may, in some embodiments, wrap around the front tip of the write pole tip 124 along the X-Z plane to form a box shield. However, such a configuration can easily accumulate and distribute magnetization that promotes unwanted data bit erasure. Thus, the front shield 134 is positioned uptrack from the write pole 122 along the Y axis, as illustrated in FIG. 1. The front shield 134 continuously extends from the first side shield 128 to the second side shield 130 to span the write pole 122 and the write pole tip 124.

It is noted that positioning magnetic front shield material, such as CoFe or NiFe alloys, close to the write pole body 126 and/or tip 124 with a uniform throat height 136 can increase magnetic flux leakage and degrade data writing performance. With these issues in mind, various embodiments shape the front shield 134 with a varying throat height 136 along the X axis, parallel to the ABS. In the assorted embodiments shown in FIG. 2, a first throat height 136 positions greater shield material away from the write pole 122 and at least one shield feature 138 with a shaped rear surface 140 that extends towards the ABS as a notch, or recess, that where front shield 134 material is removed to present at least one smaller second throat height 142.

Solid rear surface 140 illustrates how the shield feature 138 can have a rectangular shape with linear sidewalls separated by a tuned width 144 proximal the write pole tip 124. The rectangular shield feature presents front shield 134 material that overlaps portions of the write pole body 126, as shown. Such overlap may be eliminated or tuned by adjusting the width 144 and/or shape of the shield feature 138. For example, a trapezoidal shield feature can be provided, as established by rear surfaces 146 angled with respect to the AS and meeting at a tip surface 148 that is oriented parallel to the ABS to define the smaller second throat height 142.

Figure 3:
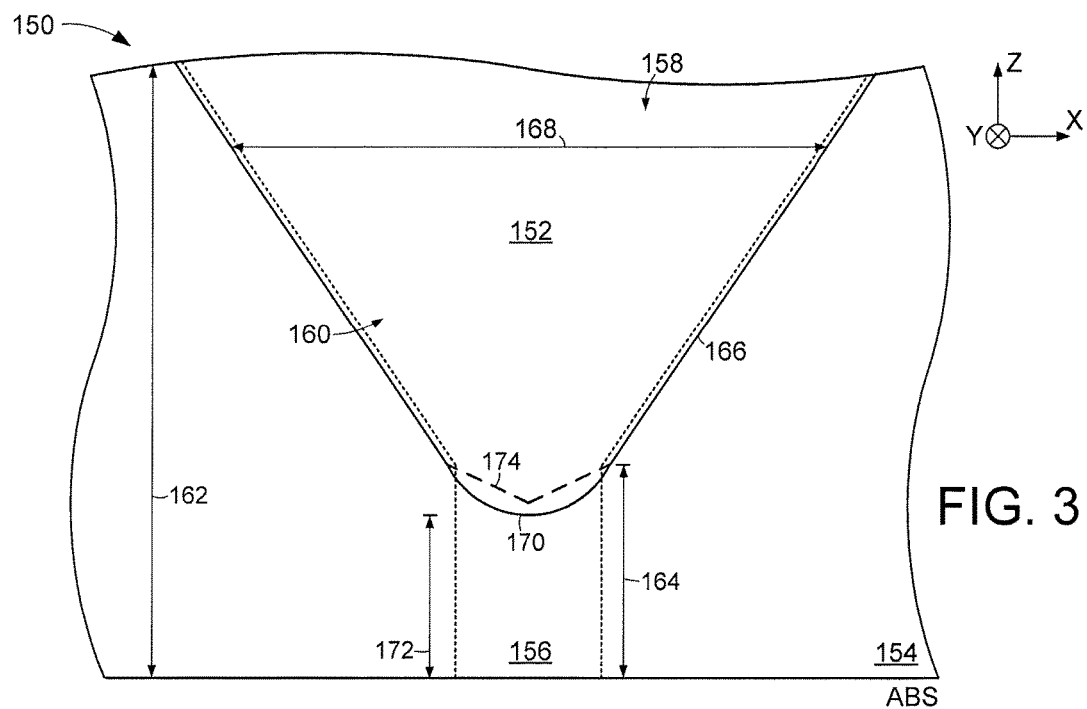
FIG. 3 shows a line representation of a portion of an example data writer organized in accordance with various embodiments.

With less magnetic front shield 134 material close to the write pole 122, the number of potential leakage flux pathways is reduced. Meanwhile, the presence of magnetic shielding material on the ABS as well as distal the write pole tip 124 provides ample shielding of stray magnetic fields. FIG. 3 displays a line representation of a portion of an example data writer 150 tuned in accordance with various embodiments to provide magnetic shielding of a write pole 152 balanced with flux leakage mitigation. The write pole 152 is positioned uptrack from a front shield 154 that continuously extends along the ABS from a first side of a write pole tip 156 of the write pole 152 to an opposite second side of the write pole tip 156 along the X axis.

The front shield 154 has a shield feature 158 that is separated from the ABS and configured with a shape that approximately matches the shape of the body 160 portion of the write pole 152 while defining a first throat height 162 distal the write pole tip 156 and a smaller second throat height 164 proximal the write pole tip 156 on the ABS. That is, the shield feature 158 can have linear or curvilinear sidewalls 166 that substantially match the position and orientation of the write pole body 160. As such, the shield feature 158 has a varying width 168 that positions the front shield sidewalls 166 to be very close to the write pole body 160.

While the shield feature 158 can have a dissimilar shape than the write pole body 160, such as the embodiment illustrated in FIG. 2, matching the write pole body 160 shape with the shield feature sidewalls 166 can allow the front shield 154 to be physically larger with greater magnetic shielding material, which can provide a relaxed shield magnetization. A matched shield feature 158 and write pole body 160 also mitigates inadvertent shunting and magnetic flux leakage between the shield 154 and write pole 152 by removing magnetic material from being immediately adjacent the write pole body 160.

In the non-limiting embodiment shown in FIG. 3, the shield feature sidewalls 166 meet at a continuously curvilinear tip surface 170 that defines a reduced throat height 172 that further removes front shield magnetic material from being immediately adjacent the write pole body 160 and tip 156. It is noted, however, that the continuously curvilinear tip surface 170 may be replaced by other shapes, such as the triangular point 174 displayed with segmented lines. The ability to tune the shape and position of the shield feature 158 to provide multiple different throat heights 162, 164, and 172 allows the front shield 154 to provide optimized shielding and data writing performance by reducing the risk of magnetic saturation of the front shield 154.

Figure 4:
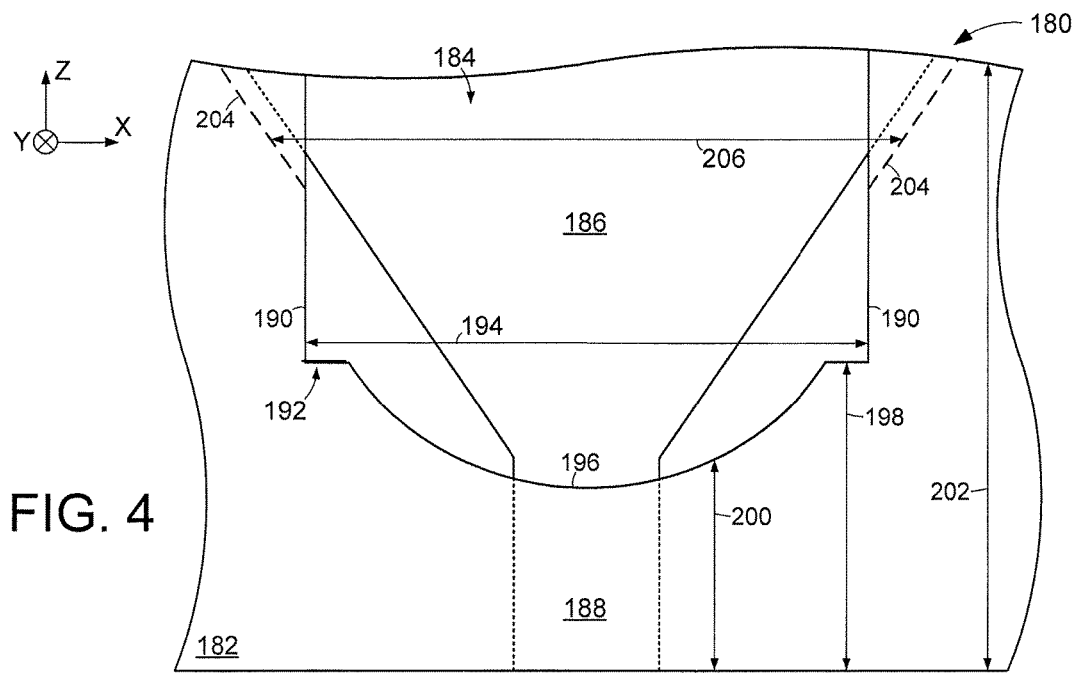
FIG. 4 displays a line representation of a portion of an example data writer constructed and operated in accordance with assorted embodiments.

In yet, configuring the shield feature 158 of a single simple shape, such as a rectangle, triangle, rhomboid, or trapezoid, can still pose a risk of unwanted shunting and flux leakage from the write pole 152. Accordingly, the shield feature 158 can be configured of multiple different shapes. FIG. 4 depicts a plan view of a portion of an example data writer 180 constructed and operated in accordance with some embodiments to optimize data writer performance by tuning a front shield 182 with a complex shaped shield feature 184. The front shield 182 extends across the write pole 186, and specifically the write pole tip 188, on the ABS.

The shield feature 184 is tuned with a shape that has linear sidewalls 190 that are oriented perpendicular to the ABS until turning to form a shoulder 192 that reduces the width 194 of the shield feature 184. The shoulder portion 192 extends to a continuously curvilinear tip surface 196 that reduces the shoulder throat height 198 of the front shield 182 to a smaller tip throat height 200. With the shield feature 184 providing multiple throat heights 198 and 200 proximal the write pole 186 that are respectively smaller than a shield throat height 202 located distal the write pole 186, the front shield 182 has ample size to adequately shield the write pole 186 without inducing flux leakage from the write pole 186.

The tuned combination of multiple different shapes in the shield feature 184 provides a balance between shielding and write pole 186 performance. In some embodiments, the linear sidewalls 190 are tuned to reduce the overlap of the front shield 182 with the write pole 186. That is, a portion of the linear sidewall 190 can be angled to match the boundary of the write pole 186, as illustrated by segmented lines 204, which can increase the width 194 of the shield feature 184 to width 206. The ability to position some portions of the front shield 182 closer to the write pole 186 through the tuned shape and size of the shield feature 184 allows the write pole 186 to have increased write field strength and gradient due to the reduced magnetic flux leaking to the front shield 182.

Figure 5:
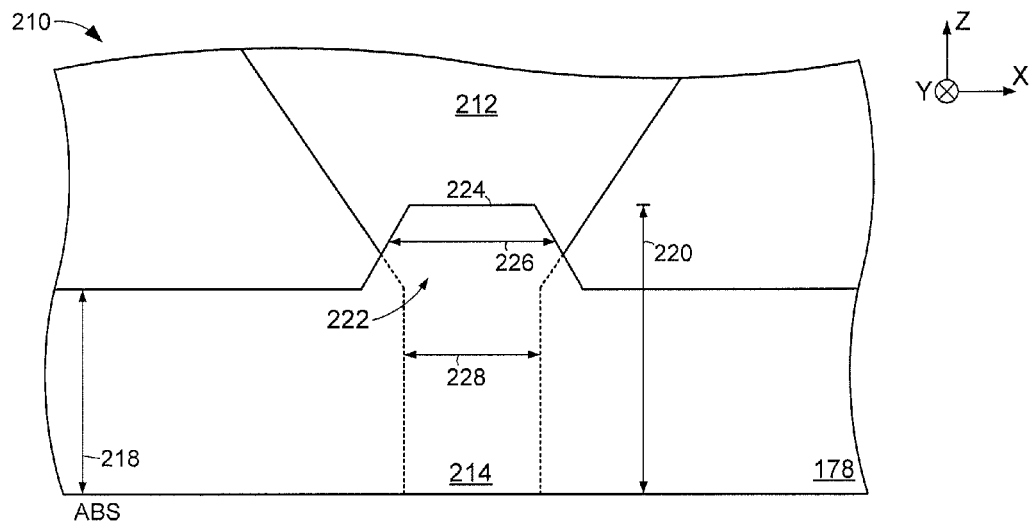
FIG. 5 is a line representation of a portion of an example data writer configured in accordance with some embodiments.

A shield feature is not limited to a particular shape, size, or configuration. FIG. 5 displays a line representation of a portion of an example data writer 210 arranged to in accordance with various embodiments. The data writer 210 has a write pole 212 that narrows to a write pole tip 214 on the ABS. A front shield 216 continuously extends to opposite sides of the write pole 212 with a throat height 218 that increases to a larger throat height 220 proximal the write pole 212 via a shield feature 222. The shield feature 222 has multiple linear sidewalls 224 defining a feature width 226 that may be greater than the width 228 of the write pole tip 214.

In comparison to the shield features of FIGS. 2-4 that remove front shield material proximal the write pole, shield feature 222 presents additional front shield 216 material through the greater throat height 220. The shield feature 222 protruding from the front shield 216 near the write pole 212 can control flux leakage to the front shield 216 by providing a pathway for excess magnetic flux in the write pole 212. The size, shape, and position of the shield feature 222 can tune the flux distribution between the front shield 216 and any side shields. In other words, the shield feature 222 can provide a tuned shunting pathway that mitigates inadvertent flux leakage from the write pole 212 to the side shields and other portions of the front shield 216 that can degrade data writer 210 performance, such as on and near the ABS.

Figure 6:
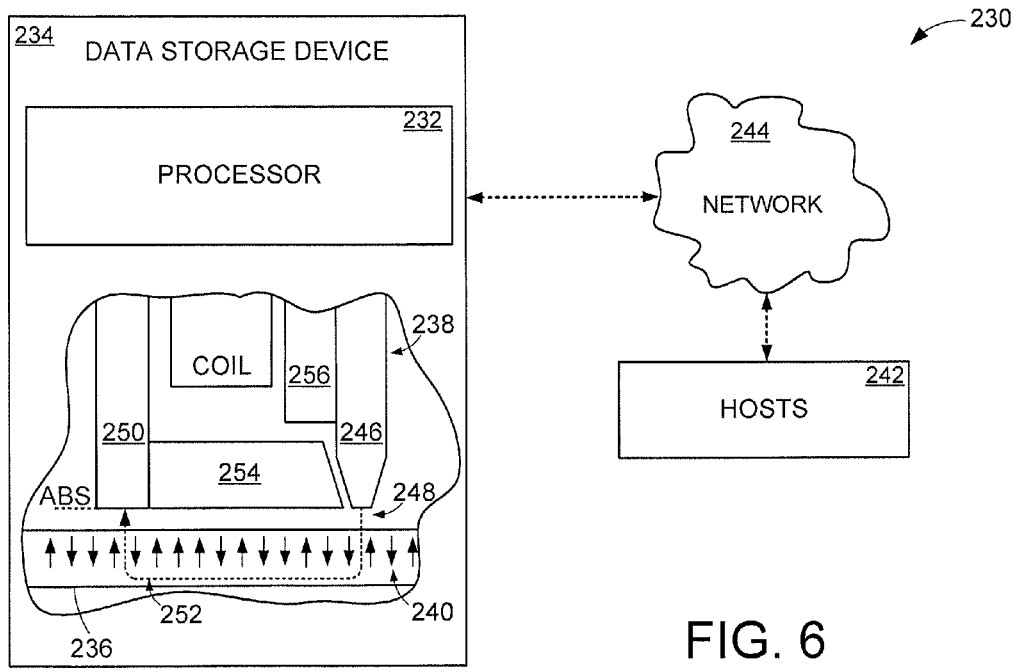
FIG. 6 conveys a block representation of an example data storage system in which various embodiments may be practiced.
Figure 7:
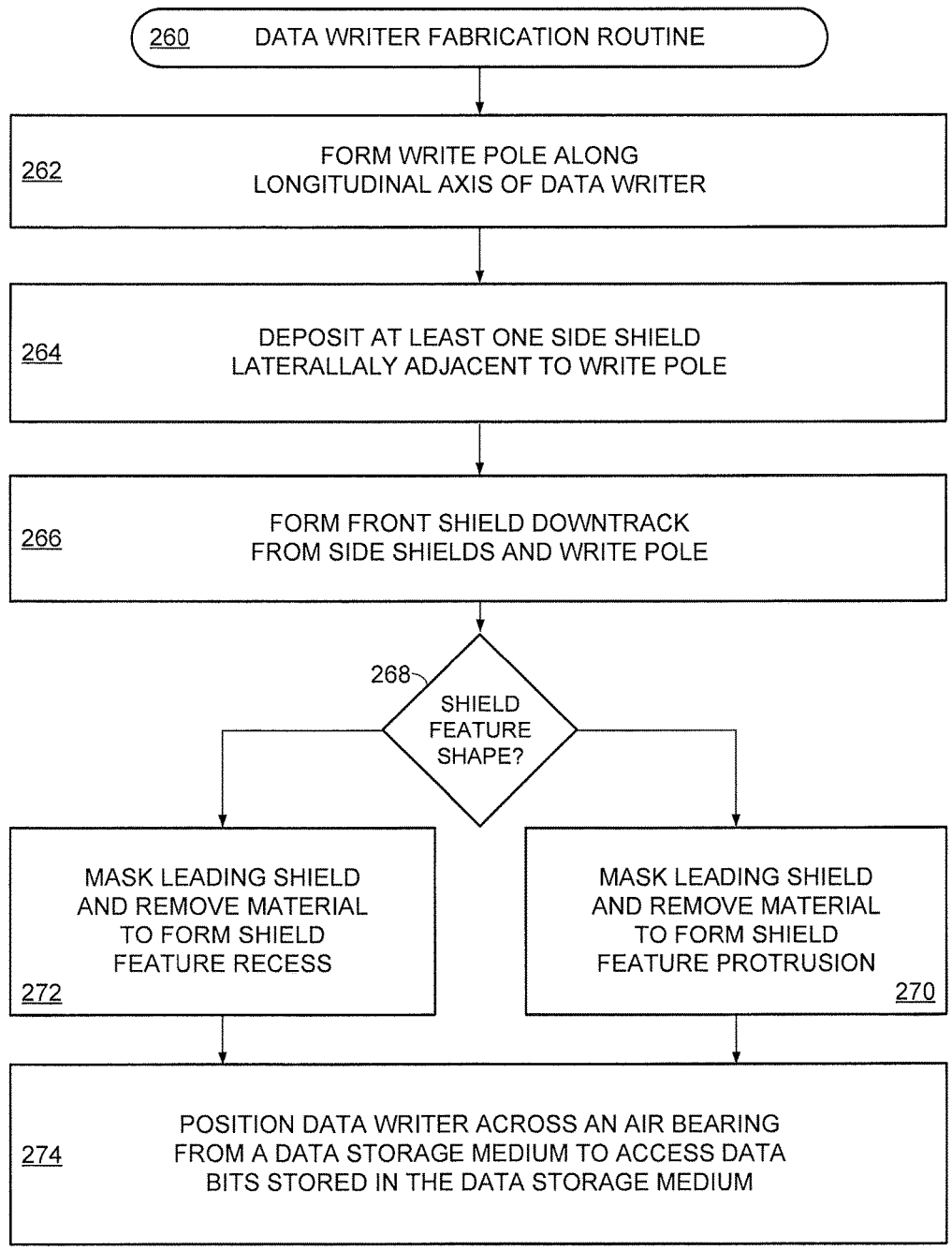
FIG. 7 provides a flowchart of an example writing element fabrication routine carried out in accordance with assorted embodiments.

FIG. 6 shows a block representation of an example data storage environment 230 configured to utilize tuned data writer in accordance with various embodiments. The environment 230 has at least one controller 232, such as a microprocessor, that communicates with and controls one or more data storage devices 234 individually or simultaneously. The data storage device 234 can be constructed and operated with at least one data storage medium 236, which is accessed by one or more data transducers 238, to store and read data in the form of data bits 240.

Assorted embodiments may package the controller 232 within the data storage device 234, while other embodiments utilize multiple controllers 232 internal and external to the data storage device 334 either concurrently or individually. The use of one or more local controllers 232 can allow multiple data storage devices 234 to be employed as part of a local data storage scheme. The ability for the controller 232 to communicate to remote hosts 242, such as other devices, nodes, and servers, over a wired or wireless network 244 via appropriate protocol, allows for other data storage schemes like redundant array of independent disks (RAID) and data caching, while providing increased computing capabilities. It should be noted that the network 244 can connect the local controller 232 to an unlimited variety and number of computing components, without limitation.

In the partial cross-sectional view of a data writer portion of the data storage device 234, the ability of a main write pole 246 to emit magnetic flux across an ABS gap 248, through the data storage medium 246 to a return pole 250 in a circuit 252, allows at least one data bit 240 to be programmed in a perpendicular orientation to the data storage medium 236 with a predetermined polarity. The linear data bit resolution of the data writer portion may be increased by placing a magnetic shield 254 between the main 246 and return 250 poles, but the proximity of the shield 254 to the main write pole 246 may induce magnetic shunting that decreases the effective magnetic field and magnetic saturation provided by the coil and yoke 256 that results in lower magnetic field gradient at the ABS.

A data storage system can be configured with an unlimited variety of data storage devices constructed and operated in a diverse variety of manners. However, various embodiments utilize the example data writer fabrication routine 260 of FIG. 10 to manufacture at least one data writing means of a data storage device. Routine 260 can begin with step 262 depositing a write pole tip through the deposition of magnetic material that may be similar, or dissimilar, to a leading shield. Step 262 can shape the write pole to have a write pole body with a greater width than a write pole tip as measured parallel to the ABS.

Next, step 264 deposits at least one side shield laterally adjacent to, and separated from, the write pole. Step 264 may form the side shield to partially or completely surround a leading tip of the write pole, but such configurations are not required. A non-magnetic material is then positioned in the write gap between the write pole and laterally adjacent side shields. It is contemplated that the non-magnetic material is deposited partially at various times, such as before the write pole is formed in step 262. A front shield is subsequently formed downtrack from the side shields and write pole in step 266 by depositing a front shield material, such as CoFe, NiFe, or alloy thereof, with a first throat height along a first axis and a thickness along a second axis, perpendicular to the first axis.

The shape of a shield feature is evaluated in decision 268 to determine if the shield feature is to protrude, like feature 222 of FIG. 5, or is to recess, like feature 138 of FIG. 2. If the shield feature is to protrude, step 270 masks the shield feature location and proceeds to remove front shield material to define a longer front shield throat height centered along a longitudinal axis and a shorter throat height positioned distal the longitudinal axis. In the event decision 268 chooses for the shield feature to recede into the front shield, step 272 masks and removes front shield material about the longitudinal axis of the data writer.

It is noted that the shield features formed in either step 270 or 272 may incorporate more than one material removal and shaping steps that form linear and/or curvilinear surfaces for the shield feature. In accordance with some embodiments, the shield feature from step 272 defines a reduced throat height proximal the longitudinal axis of the write pole. Formation of the front shield in steps 270 or 272 can proceed to step 274 where the data writer is positioned across an air bearing from a data storage medium, such as part of a transducing head, to conduct various data access operations on data bits stored in the data storage medium.

Through the tuned shaping of the front shield of a data writer, areal data capacity of a data storage device can be increased by providing larger write fields and field gradients at the ABS. Mitigation of shunting and flux leakage from the write pole to the front shield corresponding to a shield feature that defines different front shield throat heights from the ABS. Tuning a shield feature to recede into the front shield proximal a write pole tip reduces the risk of shield saturation, which mitigates possible adjacent track interference and side track erasure conditions.

While the embodiments have been directed to magnetic programming, it will be appreciated that the claimed technology can readily be utilized in any number of other applications, such as data reading sensors. It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising a write pole disposed between first and second side shields and positioned uptrack from a front shield on an air bearing surface (ABS), the front shield continuously extending from the first side shield to the second side shield with a varying throat height that defines a shaped notch proximal a write pole tip of the write pole, the shaped notch separated from the ABS and having a first shield sidewall overlapping a first body sidewall of the write pole and a second shield sidewall overlapping a second body sidewall of the write pole, the first and second shield sidewalls each respectively overlapping only one body sidewall of the write pole.

2. The apparatus of claim 1, wherein the first shield sidewall continuously extends from a first throat height to a second throat height.

3. The apparatus of claim 1, wherein the first shield sidewall is oriented perpendicular to the ABS while overlapping the first body sidewall.

4. The apparatus of claim 1, wherein the first shield sidewall has a different shape than the first body sidewall of the write pole.

5. The apparatus of claim 4, wherein the first body sidewall connects a body portion of the write pole with the write pole tip.

6. The apparatus of claim 4, wherein the pole first body sidewall defines a body portion of the write pole.

7. The apparatus of claim 1, wherein the second shield sidewall overlaps a different body sidewall of the write pole than the first shield sidewall.

8. The apparatus of claim 7, wherein the first and second shield sidewalls are connected by a tip surface that is oriented parallel to the ABS.

9. The apparatus of claim 8, wherein the tip surface continuously extends to opposite sides of the write pole tip.

10. The apparatus of claim 8, wherein the tip surface crosses first and second non-magnetic gap regions between the write pole and the respective side shields.

11. An apparatus comprising a write pole disposed between first and second side shields and positioned uptrack from a front shield on an air bearing surface (ABS), the front shield continuously extending from the first side shield to the second side shield with a varying throat height that defines a shaped notch proximal a write pole tip of the write pole, the shaped notch aligned with a longitudinal axis of the write pole, separated from the ABS, and having first and second shield sidewalls respectively overlapping different first and second body sidewalls of the write pole, the first and second shield sidewalls each oriented perpendicular to the ABS when overlapping the respective first and second body sidewalls.

12. The apparatus of claim 11, wherein the first shield sidewall crosses a non-magnetic gap between the write pole and first side shield.

13. The apparatus of claim 11, wherein the notch has a first width that is greater than a second width of the write pole tip and smaller than a third width of the write pole between the first and second body sidewalls.

14. The apparatus of claim 11, wherein the second shield sidewall is curvilinear.

15. The apparatus of claim 14, wherein the first shield sidewall is connected to the second shield sidewall by a linear shoulder sidewall oriented parallel to the ABS.

16. The apparatus of claim 11, wherein the first shield sidewall extends from the first side shield to a body portion of the write pole.

17. An apparatus comprising a write pole disposed between first and second side shields and positioned uptrack from a front shield on an air bearing surface (ABS), the front shield continuously extending from the first side shield to the second side shield with a first throat height uptrack from a write pole tip of the write pole and a second throat height uptrack from the first side shield, the first and second throat heights each extending from the ABS to define a shaped notch proximal the write pole tip of the write pole, the shaped notch separated from the ABS and having a first shield sidewall overlapping a first body sidewall of the write pole and a second shield sidewall overlapping a second body sidewall of the write pole, the first and second sidewalls each being continuously linear, oriented perpendicular to the ABS, and overlapping only one body sidewall of the write pole.

18. The apparatus of claim 17, wherein the first throat height is present uptrack from the second side shield.

19. The apparatus of claim 17, wherein the first side shield has a side shield sidewall that faces the write pole and has a matching shape as a pole sidewall of the write pole tip.

20. The apparatus of claim 19, wherein the shield and pole sidewalls have a different shape than the first shield sidewall.

* * * * *